US011361668B1

(12) United States Patent
Govindillam et al.

(10) Patent No.: US 11,361,668 B1
(45) **Date of Patent: *Jun. 14, 2022**

(54) COLLISION AWARENESS SYSTEM FOR GROUND OPERATIONS

(71) Applicant: Honeywell International Inc., Charlotte, NC (US)

(72) Inventors: Sreenivasan K Govindillam, Bengaluru (IN); Sivakumar Kanagarajan, Madurai (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/132,737

(22) Filed: Dec. 23, 2020

Related U.S. Application Data

(63) Continuation of application No. 16/459,411, filed on Jul. 1, 2019, now Pat. No. 10,916,152.

(51) Int. Cl.
*B64D 47/00* (2006.01)
*G08G 5/00* (2006.01)
*G08G 5/04* (2006.01)
*G08G 5/06* (2006.01)

(52) U.S. Cl.
CPC ........... *G08G 5/045* (2013.01); *G08G 5/0021* (2013.01); *G08G 5/0043* (2013.01); *G08G 5/06* (2013.01)

(58) Field of Classification Search
CPC .... G08G 5/045; G08G 5/0021; G08G 5/0043; G08G 5/06; G08G 5/0026; G08G 5/0082; G08G 5/04; G08G 5/065
USPC .......................................................... 340/983
See application file for complete search history.

(56) References Cited

U.S. PATENT DOCUMENTS

| | | | |
|---|---|---|---|
| 6,118,401 | A | 9/2000 | Tognazzini |
| 8,019,529 | B1 | 9/2011 | Sharma et al. |
| 9,047,771 | B1 | 6/2015 | Thoreen et al. |
| 9,836,661 | B2 | 12/2017 | Zhou et al. |
| 2002/0093433 | A1 | 7/2002 | Kapadia et al. |
| 2003/0169335 | A1 | 9/2003 | Monroe |
| 2010/0109936 | A1 | 5/2010 | Levy |
| 2010/0231721 | A1 | 9/2010 | Meloche et al. |
| 2012/0075461 | A1 | 3/2012 | Yu et al. |
| 2013/0110323 | A1 | 5/2013 | Knight |
| 2013/0321176 | A1 | 12/2013 | Vasek et al. |
| 2014/0142838 | A1 | 5/2014 | Durand |
| 2016/0071422 | A1 | 3/2016 | Bazawada et al. |
| 2016/0196754 | A1 | 7/2016 | Surace |

(Continued)

OTHER PUBLICATIONS

Response to Extended Search Report dated Dec. 16, 2020, from counterpart European Application No. 20181772.3, filed Jan. 27, 2021, 18 pp.

(Continued)

*Primary Examiner* — Tanmay K Shah
(74) *Attorney, Agent, or Firm* — Shumaker & Sieffert, P.A.

(57) ABSTRACT

In some examples, a collision awareness system includes a receiver configured to receive a first clearance for a first vehicle, receive a first image of the first vehicle, and receive a second clearance for a second vehicle. The collision awareness system also includes processing circuitry configured to determine that the first vehicle is positioned incorrectly based on the first clearance and the first image. The processing circuitry is also configured to generate an alert based on the second clearance and in response to determining that the first vehicle is positioned incorrectly.

20 Claims, 11 Drawing Sheets

(56) References Cited

U.S. PATENT DOCUMENTS

| | | | |
|---|---|---|---|
| 2018/0233052 | A1 | 8/2018 | Shamasundar et al. |
| 2018/0301043 | A1 | 10/2018 | Rutkiewicz et al. |
| 2019/0381977 | A1 | 12/2019 | Kanagarajan et al. |
| 2020/0013301 | A1 | 1/2020 | Vana et al. |
| 2020/0027363 | A1 | 1/2020 | Vana et al. |

OTHER PUBLICATIONS

U.S. Appl. No. 16/459,411, filed Jul. 1, 2019, naming inventors Govindillam et al.

Besada et al., "Image-Based Automatic Surveillance for Airport Surface," Jan. 2001, 9 pp.

"Wing Tip Clearance Hazard," accessed from https://www.skybrary.aero/index.php/Wing_Tip_Clearance_Hazard, last edit to web page made Jun. 23, 2019, 8 pp.

Extended Search Report from counterpart European Application No. 20181772.3, dated Dec. 16, 2020, 8 pp.

Prosecution History from U.S. Appl. No. 16/459,411, dated May 28, 2020 through Dec. 11, 2020, 44 pp.

COLLISION AWARENESS SYSTEM FOR GROUND OPERATIONS

The present application is a continuation of U.S. application Ser. No. 16/459,411, filed on Jul. 1, 2019, the entirety of which is hereby incorporated by reference.

TECHNICAL FIELD

This disclosure relates to collision awareness for vehicles.

BACKGROUND

There are some areas where vehicle collisions are more likely to occur, such as roadway intersections and certain areas of airports. The attention of a vehicle operator is split between many tasks when operating in these areas. For example, a vehicle operator may be watching a traffic light, looking for pedestrians, watching oncoming traffic and cross traffic, and maintaining the speed of the vehicle.

At an airport, a pilot is looking for traffic such as other aircraft, ground vehicles such as automobiles, tow tugs, and baggage carts, and employees on foot. The pilot also must pay attention to the protrusions on an aircraft such as the wingtips and tail to avoid a collision. This traffic and the structures of the airport represent a potential for collisions for vehicles.

Wingtip collisions during ground operations are a key concern to the aviation industry. Wingtip collisions are important because of the increased volume of aircraft at the space around airport terminals, the different kinds of airframes, and the increased surface occupancy in the space around airport terminals. The increased traffic and complexity creates safety risks, airport surface operational disruptions, and increased costs.

Airports can have major operational disruptions when large aircraft are conducting ground operations. Aircraft damage, even for slow-moving collisions, leads to expensive and lengthy repairs, which result in operational issues for air carriers. There may also be liability issues and increases in insurance costs for airport operators and air carriers due to wingtip collisions. The risk of wingtip collisions increases as airlines upgrade their fleets because pilots are not accustomed to the larger wingspans and wing shapes that may include sharklets.

SUMMARY

In general, this disclosure relates to systems, devices, and techniques for generating an alert indicating a potential collision using images and traffic clearances. Each vehicle can receive a clearance instructing the vehicle to take a travel path or hold at a position. A collision awareness system receives the clearances and an image of at least one of the vehicles. The collision awareness system can determine whether one of the vehicles is positioned correctly based on a clearance for the vehicle and the image. The collision awareness system may be configured to generate an alert in response to determining that the vehicle is positioned incorrectly.

In some examples, a collision awareness system includes a receiver configured to receive a first clearance for a first vehicle, receive a first image of the first vehicle, and receive a second clearance for a second vehicle. The collision awareness system also includes processing circuitry configured to determine that the first vehicle is positioned incorrectly based on the first clearance and the first image. The processing circuitry is also configured to generate an alert based on the second clearance and in response to determining that the first vehicle is positioned incorrectly.

In some examples, a method for providing collision awareness includes receiving a first clearance for a first vehicle, receiving a first image of the first vehicle, and determining that the first vehicle is positioned incorrectly based on the first clearance and the first image. The method also includes receiving a second clearance for a second vehicle and generating an alert based on the second clearance and in response to determining that the first vehicle is positioned incorrectly.

In some examples, a device includes a computer-readable medium having executable instructions stored thereon, configured to be executable by processing circuitry for causing the processing circuitry to receive a first clearance for a first vehicle, receive a first image of the first vehicle, and determine that the first vehicle is positioned incorrectly based on the first clearance and the first image. The instructions are also configured to cause the processing circuitry to receive a second clearance for a second vehicle, and generate an alert based on the second clearance and in response to determining that the first vehicle is positioned incorrectly.

The details of one or more examples of the disclosure are set forth in the accompanying drawings and the description below. Other features, objects, and advantages will be apparent from the description, drawings, and claims.

DETAILED DESCRIPTION

Figure 1:
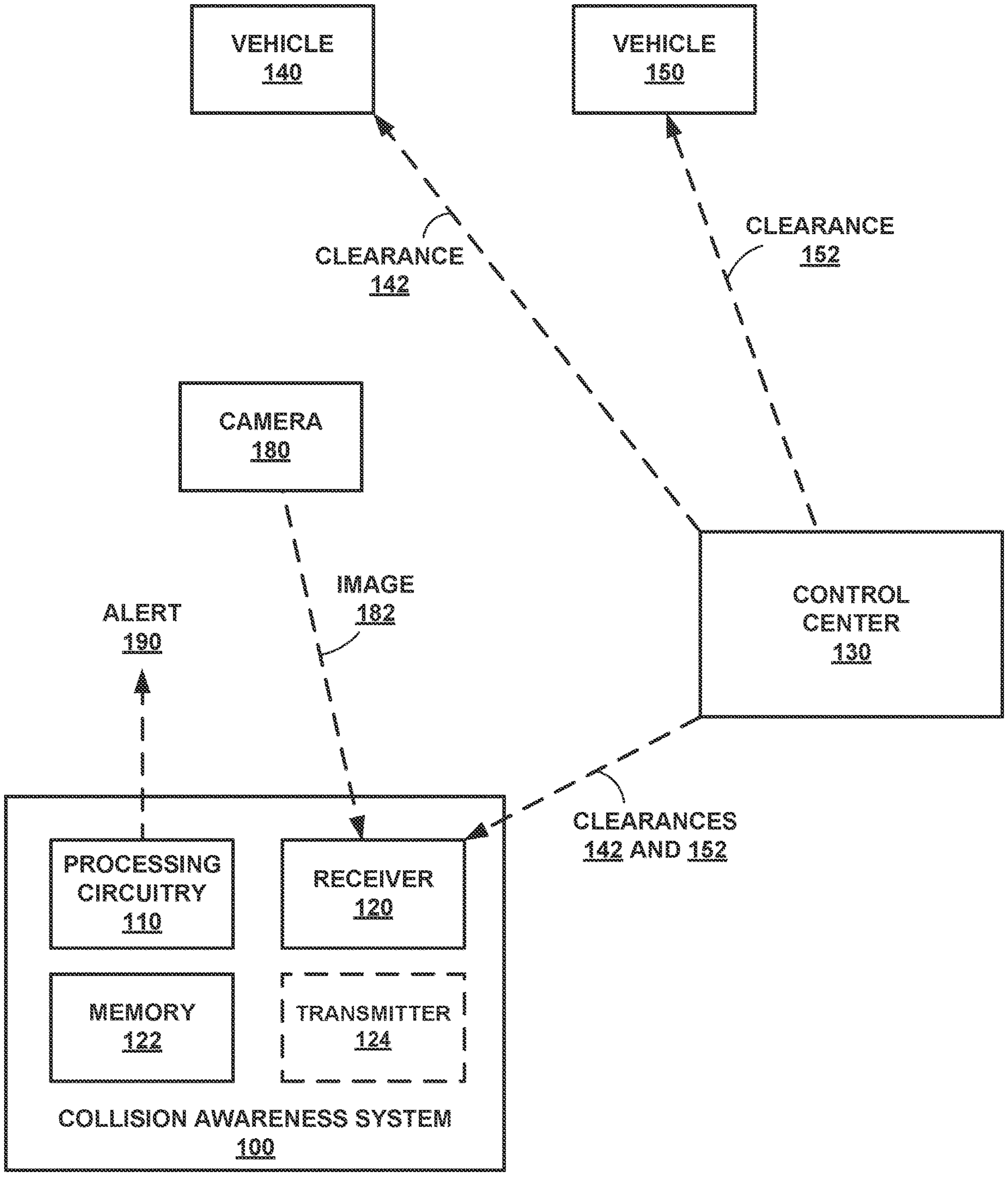
FIG. 1 is a conceptual block diagram of a collision awareness system that can generate an alert based on clearances and an image, in accordance with some examples of this disclosure.

Various examples are described below for a context-based approach to predicting a potential collision and generating an alert in response to predicting the potential collision. A system can include processing circuitry with built-in intelligence configured to predict a potential collision based on an image taken of a vehicle and a clearance for a vehicle. In examples in which the processing circuitry is determining whether there may be a potential collision between two vehicles, the processing circuitry can determine that a specific intersection is common to both vehicles based on a clearance for each of the vehicles. The processing circuitry can verify whether one of the vehicles is positioned correctly based on an image of the vehicle and the clearance for the vehicle.

Although the techniques of this disclosure can be used for any type of vehicle, the techniques of this disclosure may be especially useful for airports for monitoring aircraft that are performing ground operations. During ground operations, the wingtips and tails of the aircraft are vulnerable to collisions with other vehicles and with stationary obstacles. Moreover, it may be difficult for the flight crew to assess the positions of the wingtips and tail of an aircraft. For this reason, wingtip-to-wingtip collisions and wingtip-to-tail collisions are more difficult to predict and can cause millions of dollars in damage and flight delays for travelers.

The collision awareness system described herein can be implemented as an airport-centric solution to avoid wingtip collisions. The system can use imaging and connectivity techniques to detect and prevent potential collisions between vehicles that are moving around the surface of the airport. The system can be implemented with technologies used in remote air traffic control. The system can use cameras installed in strategic locations on the airport surface to track the movement of vehicles in order to predict, alert, and avoid wingtip collisions. The system can be implemented as an airport-based solution rather than an aircraft-based solution. Image processing can be used to identify vehicles in the images captured by the camera, especially to mitigate low-visibility scenarios and hazy scenarios.

Other means for predicting wingtip collisions, such as the use of database or ADS-B receivers, are not as precise and accurate when compared with high-precision image processing. Using high-precision cameras installed in an area around a terminal at an airport and also using aircraft connectivity technologies, the system can provide a real-time solution with timely alerts to traffic controllers and vehicle operators. The system can be used in conjunction with mobile-based platforms, electronic flight bags (EFBs), or any service-based platform. The system can be implemented without requiring any additional hardware installation into vehicles. The system can relay resolved warnings and alerts to the affected or nearby vehicles. Vehicles equipped with suitable displays can present alerts, safety envelopes, captured images to vehicle operators and crew. The display can, dynamically and in real-time, present graphical representations of dynamic hot spots for wingtip collisions on a graphical user interface including an airport map. Even vehicles without suitable display can present an aural alert to vehicle operators and crew.

FIG. 1 is a conceptual block diagram of a collision awareness system 100 that can generate an alert 190 based on clearances 142 and 152 and an image 182, in accordance with some examples of this disclosure. Collision awareness system 100 includes processing circuitry 110, receiver 120, memory 122, and optional transmitter 124. Collision awareness system 100 may be configured to predict a potential collision between vehicles 140 and 150 or between one of vehicles 140 and an object such as a building or a pole based on contextual information such as clearances 142 and 152 issued by control center 130.

Processing circuitry 110 may be configured to predict potential collisions based on received data. For example, processing circuitry 110 can use clearances 142 and 152 and image 182 to determine the likelihood of a collision involving one of vehicles 140 and 150. For the issued clearances such as clearances 142 and 152, processing circuitry 110 can also determine a potential collision based on navigation data, such as Global Navigation Satellite System (GNSS) data from vehicles 140 and 150, data from sensors on vehicles 140 or 150, and data from other sensors.

Processing circuitry 110 may include any suitable arrangement of hardware, software, firmware, or any combination thereof, to perform the techniques attributed to processing circuitry 110 herein. Examples of processing circuitry 110 include any one or more microprocessors, digital signal processors (DSPs), application specific integrated circuits (ASICs), field programmable gate arrays (FPGAs), or any other equivalent integrated or discrete logic circuitry, as well as any combinations of such components. When processing circuitry 110 includes software or firmware, processing circuitry 110 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. processing circuitry 110 may include memory 122 configured to store data. Memory 122 may include any volatile or non-volatile media, such as a random access memory (RAM), read only memory (ROM), non-volatile RAM (NVRAM), electrically erasable programmable ROM (EEPROM), flash memory, and the like. In some examples, memory 122 may be external to processing circuitry 110 (e.g., may be external to a package in which processing circuitry 110 is housed).

Processing circuitry 110 can generate alert 190 in response to predicting a potential collision involving one of vehicles 140 and 150. Processing circuitry 110 can transmit alert 190 to control center 130, vehicle 140, and/or vehicle 150. In some examples, processing circuitry 110 can transmit alert 190 to vehicle 140 or 150 to cause vehicle 140 or 150 to apply brakes. Additional example details of auto-braking can be found in commonly assigned U.S. patent application Ser. No. 16/009,852, entitled "Methods and Systems for Vehicle Contact Prediction and Auto Brake Activation," filed on Jun. 15, 2018, which is incorporated by reference in its entirety.

Receiver 120 may be configured to receive clearances 142 and 152 from control center 130 and receive image 182 from camera 180. In some examples, receiver 120 can also receive GNSS data and other travel data (e.g., destination, heading, and velocity) from vehicles 140 and 150. Receiver 120 may be configured to receive data such as audio data, video data, and sensor data from vehicles 140 and 150. Collision awareness system 100 can include a single receiver or separate receivers for receiving clearances 142 and 152 from control center 130 and image 182 from camera 180. In some examples, receiver 120 can receive images from more than camera, where the cameras are positioned near hotspots, such as intersections, parking areas, and the gates at an airport.

Receiver 120 may be configured to clearances 142 and 152 as digital data and/or audio data from control center 130. For example, control center 130 can transmit clearances 142 and 152 over controller-pilot data link communications (CPDLC). Processing circuitry 110 may be configured to create a transcript of clearances 142 and 152 using voice recognition techniques. Additionally or alternatively, control center 130 can create the transcript of clearances 142 and 152 and transmit the transcript to receiver 120. Processing circuitry 110 can determine a future position of the vehicle based on the audio data.

In some examples, collision awareness system 100 includes more than one receiver. A first receiver can receive image 182 from camera 180, and a second receiver can receive clearances 142 and 152 from control center 130. Additionally or alternatively, receiver 120 can be integrated into control center 130 or camera 180, such that that collision awareness system 100 receives image 180 or clearances 142 and 152 via a data bus or a software process.

For example, control center 130 and collision awareness system 100 may be implemented on the same processing circuitry 110.

Control center 130 is configured to control the movement of vehicles in a specific region. Control center 130 may include an air traffic controller, an Advanced Surface Movement Guidance and Control System (A-SMGCS), an autonomous vehicle control center, or any other system for controlling the movements of vehicles. In the example of an air traffic controller, control center 130 can monitor and command the movements of vehicles 140 and 150 on and around taxiways, runways, intersections, apron parking bays, gates, hangars, and other areas around an airport.

Collision awareness system 100 can be separate from control center 130. However, in some examples, collision awareness system 100 is integrated into control center 130, such that collision awareness system 100 and control center 130 may share processing circuitry 110. In examples in which collision awareness system 100 and control center 130 are integrated, control center 130 can communicate clearances 142 and 152 internally (e.g., through wires), such that receiver 120 may not include an antenna.

Vehicles 140 and 150 may be any mobile objects or remote objects. In some examples, vehicles 140 and/or 150 may be an aircraft such as an airplane, a helicopter, or a weather balloon, or vehicles 140 and/or 150 may be a space vehicle such as a satellite or spaceship. For example, vehicles 140 and 150 may be aircraft that conduct ground operations at an airport and receive clearances 142 and 152 from control center 130. In yet other examples, vehicles 140 and/or 150 may include a land vehicle such as an automobile or a water vehicle such as a ship or a submarine. Vehicles 140 and/or 150 may be a manned vehicle or an unmanned vehicle, such as a drone, a remote-control vehicle, or any suitable vehicle without any pilot or crew on board.

Clearances 142 and 152 can include commands, directions, authorizations, or instructions from control center 130 to vehicles 140 and 150 on how vehicles 140 and 150 should proceed. Control center 130 can communicate clearance 142 to vehicle 140 to command vehicle 140 where or how to proceed. Through clearance 142, control center 130 can set a destination, future position(s), travel path, maneuver, and/or speed for vehicle 140, command vehicle 140 to remain at a current position, command vehicle 140 to proceed through an intersection, or command vehicle 140 to travel to another position, stop, and wait for a future command. In examples in which vehicles 140 and 150 are aircraft, clearance 142 or 152 can clear vehicle 140 or 150 to takeoff from a runway or land on a runway. Control center 130 can transmit clearances 142 and 152 to vehicles 140 and 150 as audio data, text data, digitally encoded data, and/or analog encoded data.

In some examples, processing circuitry 110 can determine the likelihood of a collision between vehicles 140 and 150 based on clearances 142 and 152 and GNSS data received from vehicles 140 and 150. Based on clearances 142 and 152, processing circuitry 110 can determine the travel paths and future positions of vehicles 140 and 150. However, vehicles 140 and 150 may not be positioned correctly given clearances 142 and 152. In other words, control center 130 can issue clearance 142 to vehicle 140 to travel to a specific location and stop, but vehicle 140 may not stop at the exact location commanded by control center 130. Thus, clearances 142 and 152 may not be accurate indications of the future positions of vehicles 140 and 150.

Processing circuitry 110 can determine the approximate locations of vehicles 140 and 150 based on GNSS data. However, the GNSS position for vehicle 140 does not indicate the position of the protrusions of vehicle 140. In examples in which vehicle 140 is a very large vehicle (e.g., a commercial airplane or a semi-trailer truck), a protrusion of vehicle 140 such as a wingtip or a tail may extend a large distance away from the center of vehicle 140. Therefore, GNSS data is not an accurate characterization of the position of all portions of a vehicle. Surveillance technology such as automatic-dependent surveillance-broadcast (ADS-B) can have similar issues.

In accordance with the techniques of this disclosure, processing circuitry 110 can use clearance 142 and image 182 to determine whether vehicle 140 is positioned correctly. In response to determining that vehicle 140 is positioned incorrectly, processing circuitry 110 can generate alert 190 to warn of a potential collision between vehicles 140 and 150. By combining clearance 142 and image 182, processing circuitry 110 can determine the possibility of a collision involving vehicle 140 when instead using only clearances 142 and 152 and GNSS data, processing circuitry 110 may not have determined a potential collision.

For example, GNSS data may indicate that vehicle 140 is positioned correctly, but using image 182, processing circuitry 110 can determine whether any portion of vehicle 140 is extending outside of a safe area. In examples in which vehicle 140 is parked, a portion of vehicle 140 may extend into a roadway or an intersection even when the GNSS data for vehicle 140 indicates that vehicle 140 is positioned correctly. For aircraft with large wingspans, GNSS data may provide no indication of the locations of the wingtips of the aircraft.

Processing circuitry 110 can determine whether to generate alert 190 based on the dimensions of vehicle 140 and/or 150. For example, processing circuitry 110 can determine the model or type of vehicle 140 or 150 based on clearance 142 or 152 and/or image 182. Processing circuitry 110 can lookup or query the dimensions of vehicle 140 or 150 based on the known model or type of vehicle 140 or 150. For example, if processing circuitry 110 determines that vehicle 140 is a specific type of aircraft, processing circuitry 110 can determine the length and wingspan of vehicle 140. Processing circuitry 110 may be able to query a database of vehicle dimensions, or memory 122 may store data indicating vehicle dimensions.

Camera 180 can capture images of vehicle 140 and/or 150. Camera 180 may include a visible-light camera, an infrared camera, and/or any other type of camera. Camera 180 can be set up at a fixed position by mounting camera 180 to a pole or attaching camera 180 to a building. Additionally or alternatively, camera 180 may be moveable or attached to a moveable object such as a vehicle (e.g., an unmanned aerial vehicle). In examples in which camera 180 is mounted on a vehicle, camera 180 can be moved so that camera 180 can monitor hot spots or strategic locations such as intersections and parking areas. Camera 180 could be positioned to capture images of hot spots such as intersections, parking areas, areas where vehicle traffic merges together or diverges, or more specifically, taxiway intersections, taxiway-runway intersections, the ends of runways, parking bays and parking aprons, ramps, and/or gates at airports. Camera 180 may be a part of an existing Airport Surveillance Cameras system.

Camera 180 can be remote from vehicles 140 and 150 and attached to a static object. Camera 180 can be part of an internet of things (IoT) system that includes processing circuitry, memory, and a transmitter. The processing circuitry of the IoT system can store images captured by camera 180 to the memory. The transmitter can transmit the images to a remote collision awareness system at a later time. In some examples, collision awareness system 100 is co-located with the IoT system and camera 180, such that the images do not need to be transmitted to a remote system. The co-located collision awareness system 100 can perform the techniques of this disclosure using the processing circuitry coupled to camera 180.

Image 182 shows vehicle 140 and, in some examples, other objects such as vehicle 150. Image 182 can also show debris or other obstacles. Processing circuitry 110 can determine the position of vehicle 140 by identifying objects, landmarks, vehicles, and so forth in image 182, including objects with known locations. Processing circuitry 110 can use image processing techniques to compare the location of vehicle 140 shown in image 182 to the locations of other objects shown in image 182. Processing circuitry 110 can also use the position and angle of camera 180, along with the characteristics of vehicle 140 shown in image 182, to determine the position of vehicle 140. In examples in which image 182 is blurry or low-resolution, processing circuitry 110 can use known characteristics of vehicle 140 to determine the position of vehicle 140 in image 182. Processing circuitry 110 can also use image processing techniques to match keypoints on vehicle 140 shown in multiple images to determine the location and/or movement of vehicle 140.

Although this disclosure describes processing circuitry 110 using image 182 to determine the actual location of vehicle 140, other implementations are considered. For example, processing circuitry 110 can use other means of non-cooperative surveillance to determine the position of vehicle 140 and/or vehicle 150. Other means of non-cooperative surveillance include radar and/or microwave sensors. Processing circuitry 110 can use any of these means of determining the position of vehicle 140 in order to determine whether vehicle 140 is positioned correctly.

Processing circuitry 110 may be configured to determine whether vehicle 140 is positioned correctly based on clearance 142 and image 182. Clearance 142 can indicate that vehicle 140 should be positioned at a specific location or position. Processing circuitry 110 can determine that vehicle 140 is positioned correctly at the specific location by determining that vehicle 140 is positioned within an acceptable distance (e.g., a threshold distance) of the specific location. Processing circuitry 110 can determine that vehicle 140 is positioned incorrectly by determining that vehicle 140 is not positioned within an acceptable distance of the specific location. Processing circuitry 110 can also determine that vehicle 140 is positioned incorrectly by determining that a portion of vehicle 140 is extending into an area with a higher likelihood of collision such as a roadway or an intersection. Processing circuitry 110 can determine that vehicle 140 is positioned incorrectly by determining that vehicle 140 is within a threshold distance of a certain object, such as another vehicle, or located in or outside of a defined zone. Without using image 182, processing circuitry 110 may not be able to determine that vehicle 140 is positioned incorrectly.

Processing circuitry 110 can determine whether vehicle 140 is positioned correctly by fusing clearance 142 and image 182. For example, processing circuitry 110 can determine the travel path for vehicle 140 and fuse the travel path to image 182 by determining where vehicle 140 should travel through the area shown in image 182. Processing circuitry 110 can use the fusion of clearance 142 and image 182 to determine whether vehicle 140 is positioned correctly based on the position of vehicle 140 shown in image 182.

Processing circuitry 110 can process image 182 with clearance 142 to check whether vehicle 140 is occupying space and/or moving according to clearance 142. Processing circuitry 110 can confirm that vehicle 140 is adhering to clearance 142 by confirming that the movement of vehicle 140 is in the direction instructed by or specified by clearance 142. In response to determining that the position and movement of vehicle 140 adheres to clearance 142, processing circuitry 110 may refrain from generating alert 190. In examples in which processing circuitry 110 determines that the occupancy and/or movement of vehicle 140 does not adhere to clearance 142, processing circuitry 110 can generate suitable alert 190.

Processing circuitry 110 may be configured to generate alert 190 in response to determining that vehicle 140 is positioned incorrectly. In some examples, processing circuitry 110 can also determine that the clearance 152 indicates that vehicle 150 will travel within a threshold distance from the position indicated by clearance 142. In response to determining that vehicle 140 is positioned incorrectly and that clearance 152 indicates that vehicle 150 will travel near vehicle 140, processing circuitry 110 may be configured to generate alert 190. Processing circuitry 110 can also generate alert 190 in response to determining a potential collision between vehicle 140 and a stationary object, such as a pole or building. Processing circuitry 110 can generate alert 190 "based on clearance 152" by determining that clearance 152 instructs vehicle 150 to travel within a threshold distance of vehicle 140.

Alert 190 can be an audio alert, a visual alert, a text alert, an auto-brake alert, and/or any other type of alert. Alert 190 can have multiple severity levels such as advisory, caution, and warning. Alert 190 can also have a normal level that indicates no potential collision. Alert 190 can include information about the vehicles involved in the potential collision. Processing circuitry 110 can transmit alert 190 to vehicle 140 and/or 150, optionally with image 182 and other information about the positions of vehicle 140 and 150. For example, processing circuitry 110 can transmit an estimated time to collision to vehicle 140. The communication channel between collision awareness system 100 and vehicles 140 and 150 can be a wireless communication channel such as Wi-Fi, cellular, or a controller-pilot data link.

Figure 2:
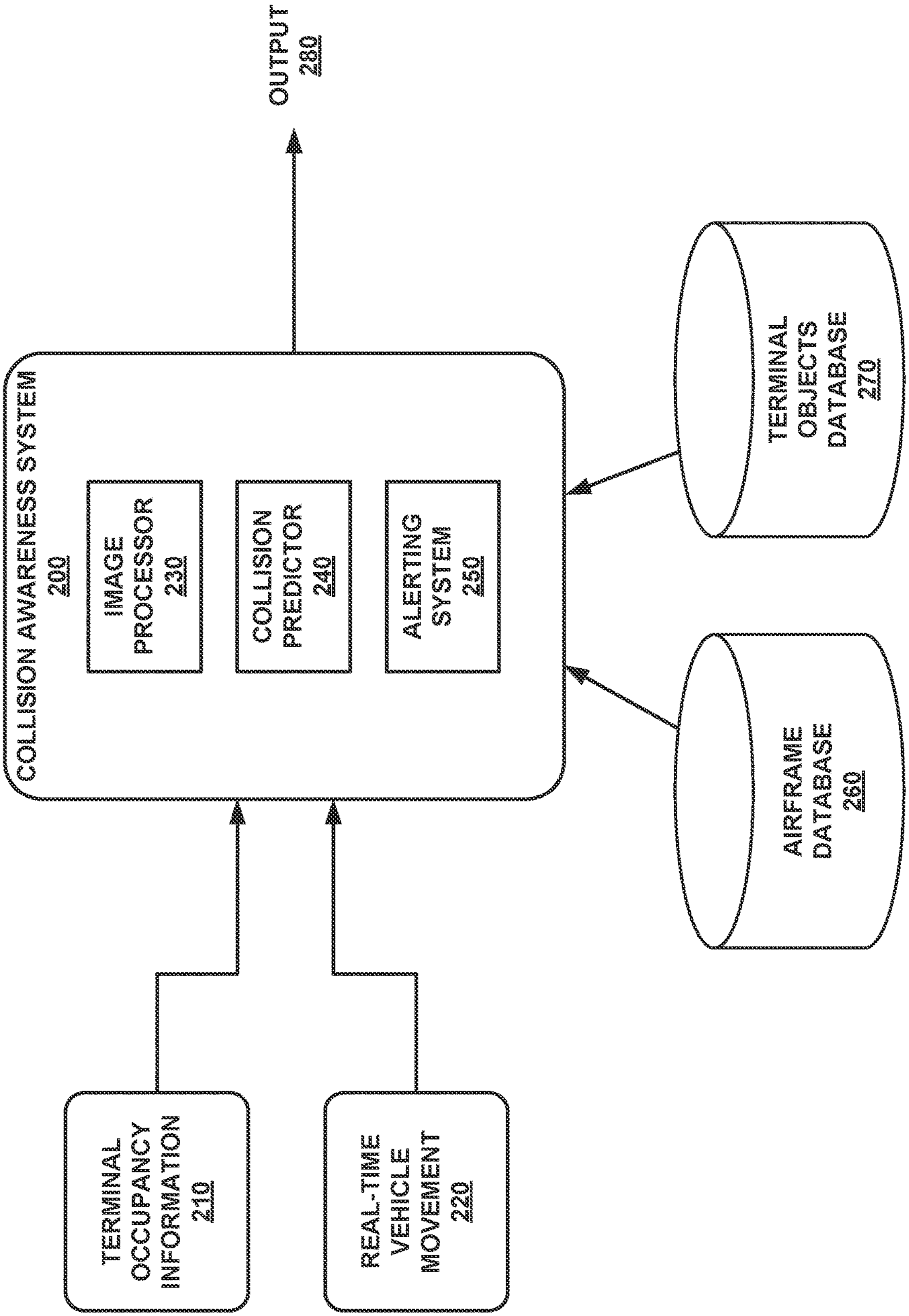
FIG. 2 is a conceptual block diagram of collision awareness system that can receive terminal occupancy information and real-time vehicle movement information, in accordance with some examples of this disclosure.

FIG. 2 is a conceptual block diagram of collision awareness system 200 that can receive terminal occupancy information 210 and real-time vehicle movement information 220, in accordance with some examples of this disclosure. Collision awareness system 200 can use information 210 and 220, along with information from airframe database 260 and terminal objects database 270, to generate output 280 such as an alert. Collision awareness system 200 can operate in any traffic situation with vehicles.

Terminal occupancy information 210 can include information about the current locations and planned travel paths of vehicles. Terminal occupancy information 210 can include gate assignments at an airport for each aircraft. Collision awareness system 200 can obtain terminal occupancy information 210 from clearances issued by a control center.

Real-time vehicle movement information 220 includes information relating to the actual movement of each vehicle along a travel path. Collision awareness system 200 can obtain real-time vehicle movement information 220 from images, surveillance messages (e.g., ADS-B, datalink), and visual guidance systems. The airport may have cameras positioned in strategic locations and pointed towards hot spots such as intersections, gates, and parking areas.

Collision awareness system 200 includes image processor 230 for analyzing images captured by cameras to determine the positions of moving and non-moving vehicles. Image processor 230 can implement video analytics and learning-based image correction techniques. Image processor 230 can identify images that are unclear or blurry and process the unclear images to generate clear versions of the images. Weather conditions, precipitation, nighttime/lowlight conditions, or a dirty camera lens can cause images to be blurry or unclear. For example, image processor 230 can determine the type of vehicle shown in an image by matching the characteristics of the image to information from airframe database 260. Collision awareness system 200 can also determine the type of vehicle from surveillance messages (e.g., ADS-B) received from the vehicle, based on a series of images, or based clearances from a control center.

Image processor 230 can determine that an image is blurry by comparing a portion of the image showing a vehicle to an airframe template for the vehicle received from airframe database 260. For example, image processor 230 can identify the vehicle as a Boeing 737 based on matching features in an image to an airframe template for a Boeing 737. Image processor 230 may then determine that the image, or another image in the sequence of images, is blurry by comparing the image to the template. Image processor 230 can identify the blurriness by determining that the differences between the vehicle shown in the image and the airframe template are greater than a threshold level. In response to determining that the image is blurry, image processor 230 can perform image processing techniques to reduce the blurriness.

Collision predictor 240 can construct safety envelopes around vehicles based on the position and velocities of vehicles determined by image processor 230 or another part of collision awareness system 200. Collision predictor 240 can determine the type of vehicle and then determine the size and shape of the safety envelope for the vehicle based on data obtained from airframe database 260 and a braking distance based on the type of vehicle and the velocity. Collision predictor 240 can construct a safety envelope or determine a size or radius of the safety envelope based on a wingspan, height, and/or length obtained from airframe database 260. In response to determining that a clearance for a first vehicle causes the first vehicle to enter the safety envelope of a second vehicle, collision predictor 240 can determine that a collision is likely to occur between the two vehicles.

Collision predictor 240 can identify potential threats, including the likelihood of a wingtip collision between vehicles. Collision predictor 240 can inform a vehicle of a dynamic hot spot near the vehicle or in the travel path of the vehicle. Collision predictor 240 can query airframe database 260 to determine the wingspan, length, and height of each vehicle in order to predict collisions. Collision predictor 240 can use the captured images to predict and present wingtip hot spots based on airframe information, the travel path of each vehicle, and the static objects around the travel path. Collision predictor 240 can obtain information about static objects in the travel path of vehicles by querying terminal objects database 270. Static objects include buildings, poles, signs, and extent of runways and taxiways.

Terminal objects database 270 may also include data about debris and other obstacles, such as image templates and standard images for debris and obstacles. Image processor 230 can determine that debris exists on a roadway, taxiway, or runway based on matching features of one or more images to a template for debris obtained from terminal objects database 270. Image processor 230 can also determine the location of the debris using image processing techniques. Collision predictor 240 can determine that the debris is located in the travel path of a vehicle. Alerting system 250 can generate output 280- to alert the vehicle and/or a control center that the debris is located in the travel path of the vehicle.

Alerting system 250 can generate output 280 by sending an alert to the cockpit or to a ground-based system. For example, alerting system 250 can activate a cockpit display or an aural alert. Alerting system 250 can generate output 280 by marking a hot spot on a traffic map to indicate to a vehicle operator or control center personnel that the hot spot has a collision threat. Alerting system 250 can transmit output 280 to the avionics bay of a subscriber aircraft that is close to or may be involved in a potential collision, and the aircraft can present an alert to the vehicle operator or crew. By using information 210 and 220 to generate output 280, collision awareness system 200 offers a real-time solution for informing vehicle operators of potential collisions.

Figure 3A:
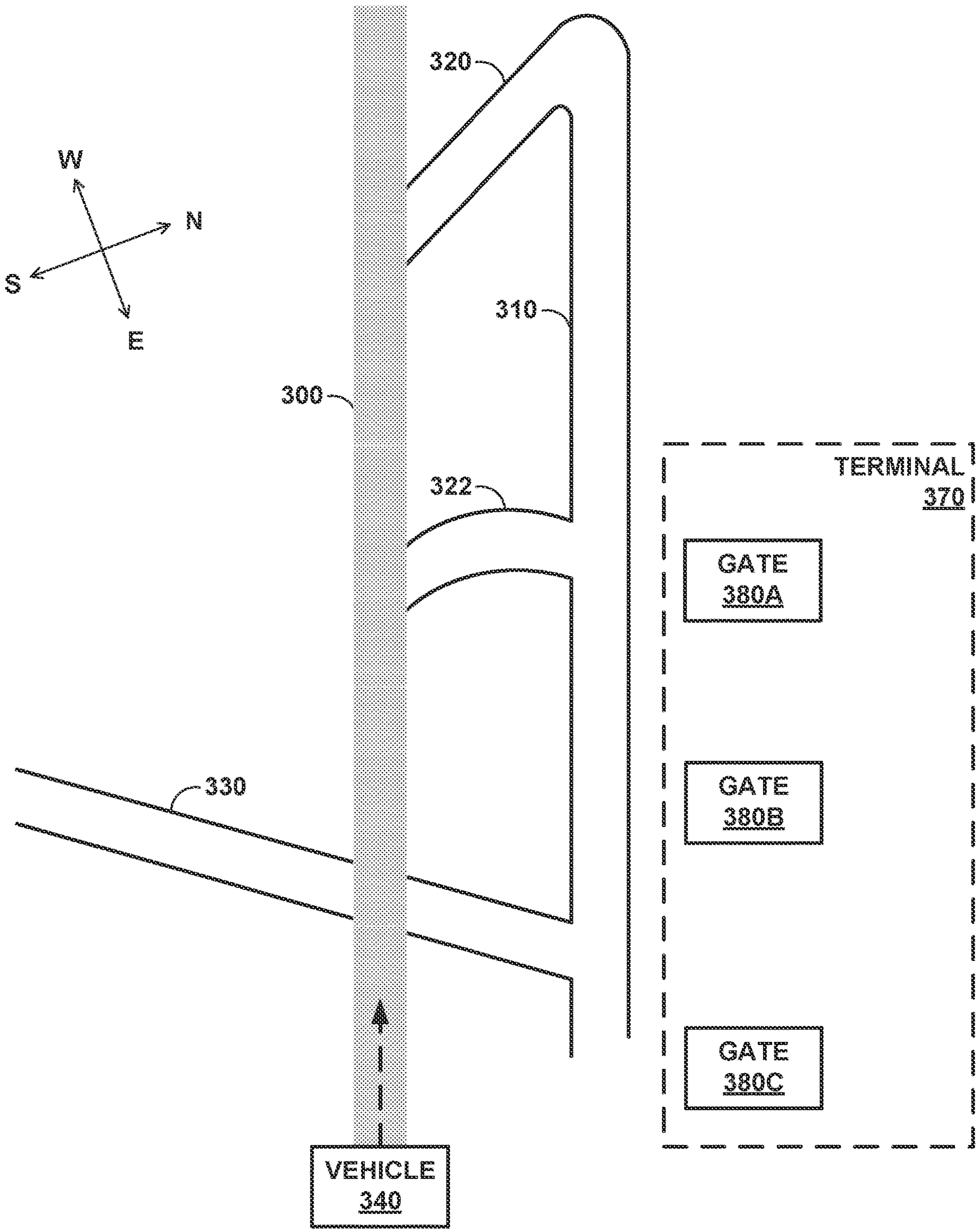
FIGS. 3A-3D are diagrams of a scenario showing two vehicles maneuvering near an airport terminal.

FIGS. 3A-3D are diagrams of a scenario showing two vehicles 340 and 350 maneuvering near an airport terminal 370. As shown in FIG. 3A, vehicle 340 lands on runway 300 and travels in a northwest direction along runway 300.

Figure 3B:
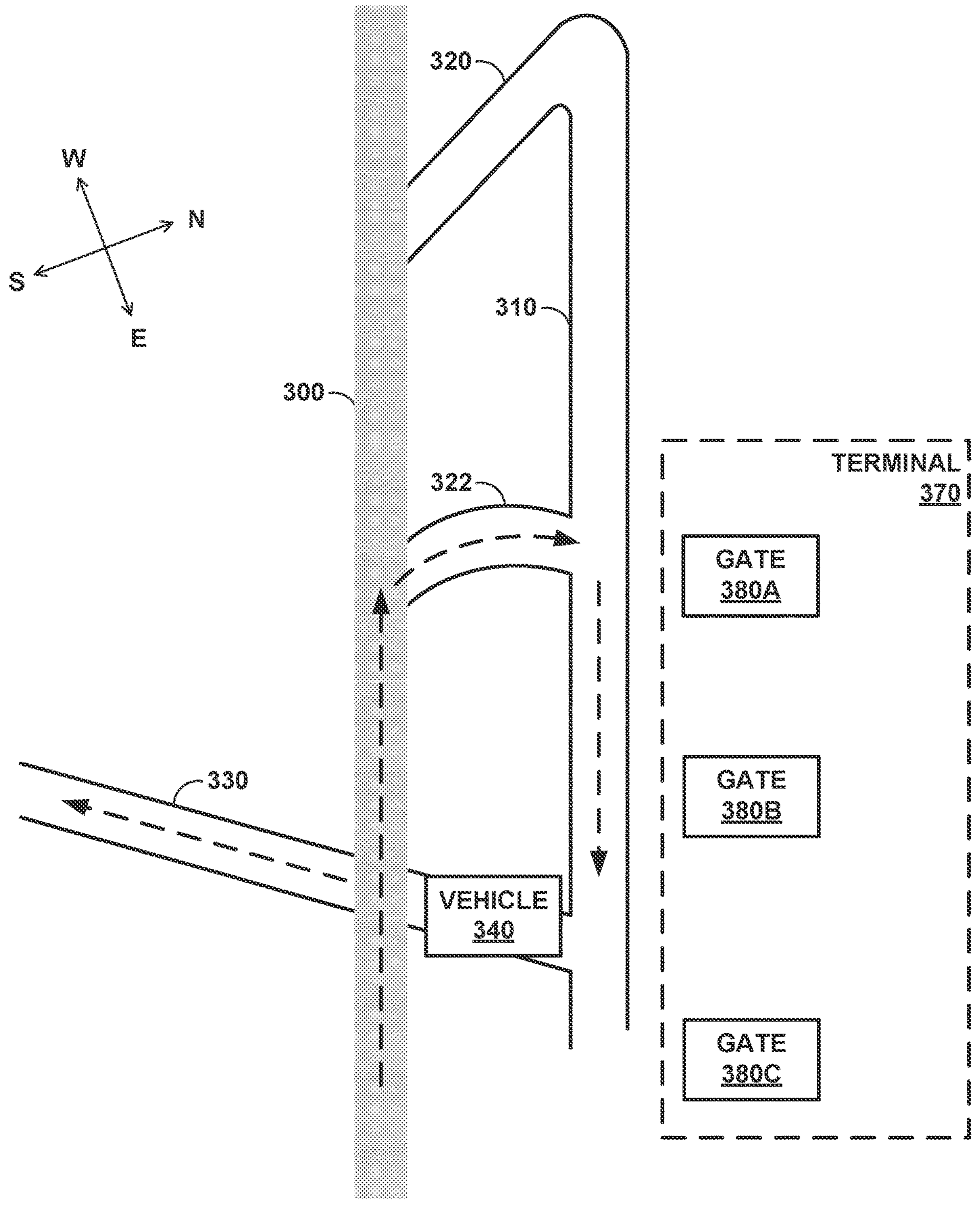

As shown in FIG. 3B, vehicle 340 receives a clearance to travel along runway 300 and use taxiway 322 to enter taxiway 310. The clearance instructs vehicle 340 to travel on taxiway 322 and make a right turn on taxiway 330 and hold short of runway 300 before proceeding southbound on taxiway 330. There may be sufficient space on taxiway 330 for vehicle 340 to park without any part of vehicle 340 obstructing vehicle travel along runway 300 or along taxiway 310. A collision awareness system may be able to determine whether vehicle 340 is positioned correctly based on an image captured of vehicle 340 and based on the received clearances, where "positioned correctly" means not obstructing vehicle travel along runway 300 or along taxiway 310.

Figure 3C:
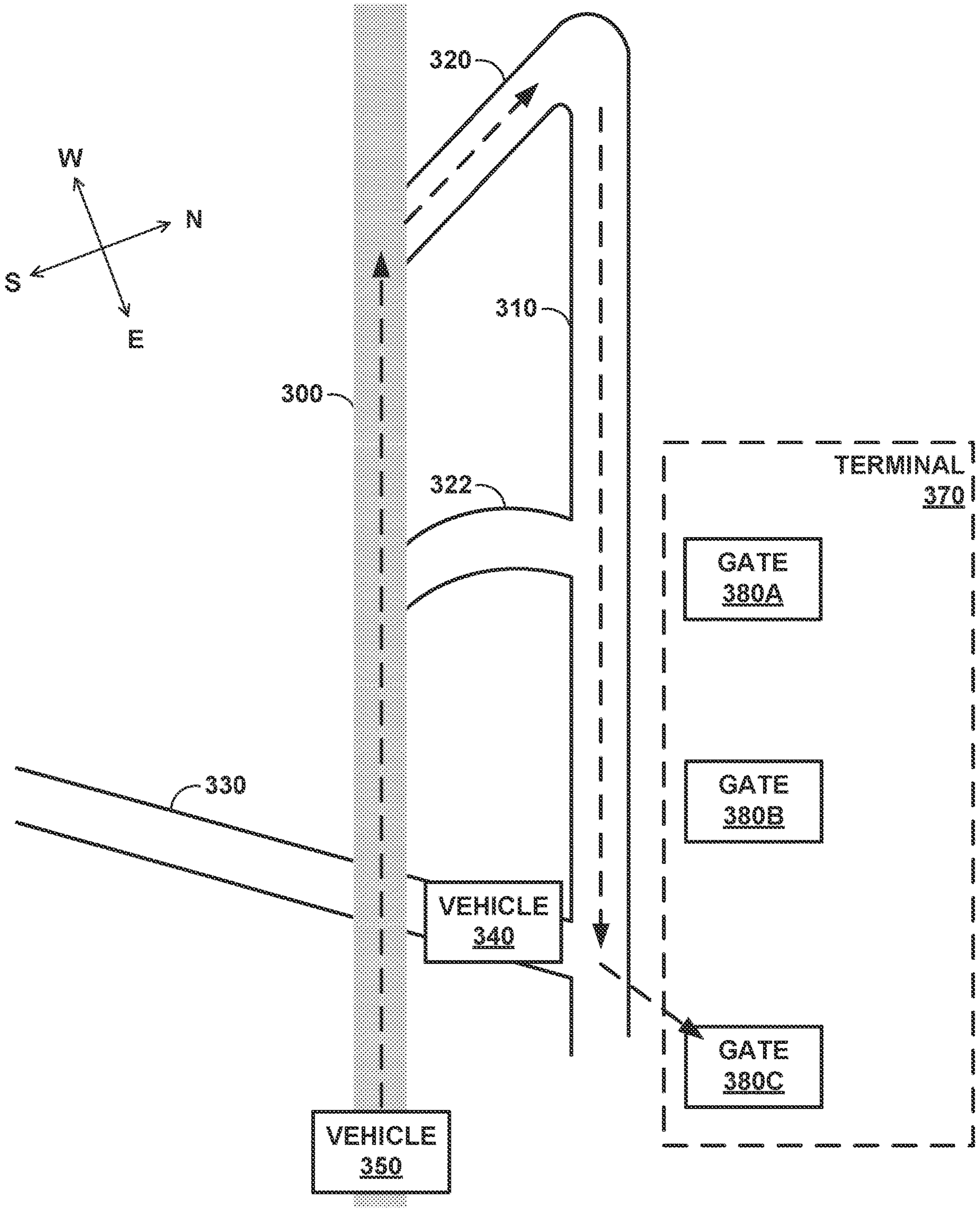

FIG. 3C shows that vehicle 350 lands on runway 300 and travels in a northwest direction along runway 300. Shortly after vehicle 350 lands, vehicle 340 turns onto taxiway 330 and stops short of runway 300. Vehicle 350 then receives a clearance to use taxiway 320 to enter taxiway 310. The clearance instructs vehicle 350 to travel on taxiway 310 past gates 380A and 380B to gate 380C. Nonetheless, a collision occurs between vehicles 340 and 350 occurs at the intersection of taxiways 310 and 330. Thus, the collision is caused by not an incursion or excursion issue for runway 300, but rather the collision occurs at a taxiway intersection at relatively slow speeds.

Figure 3D:
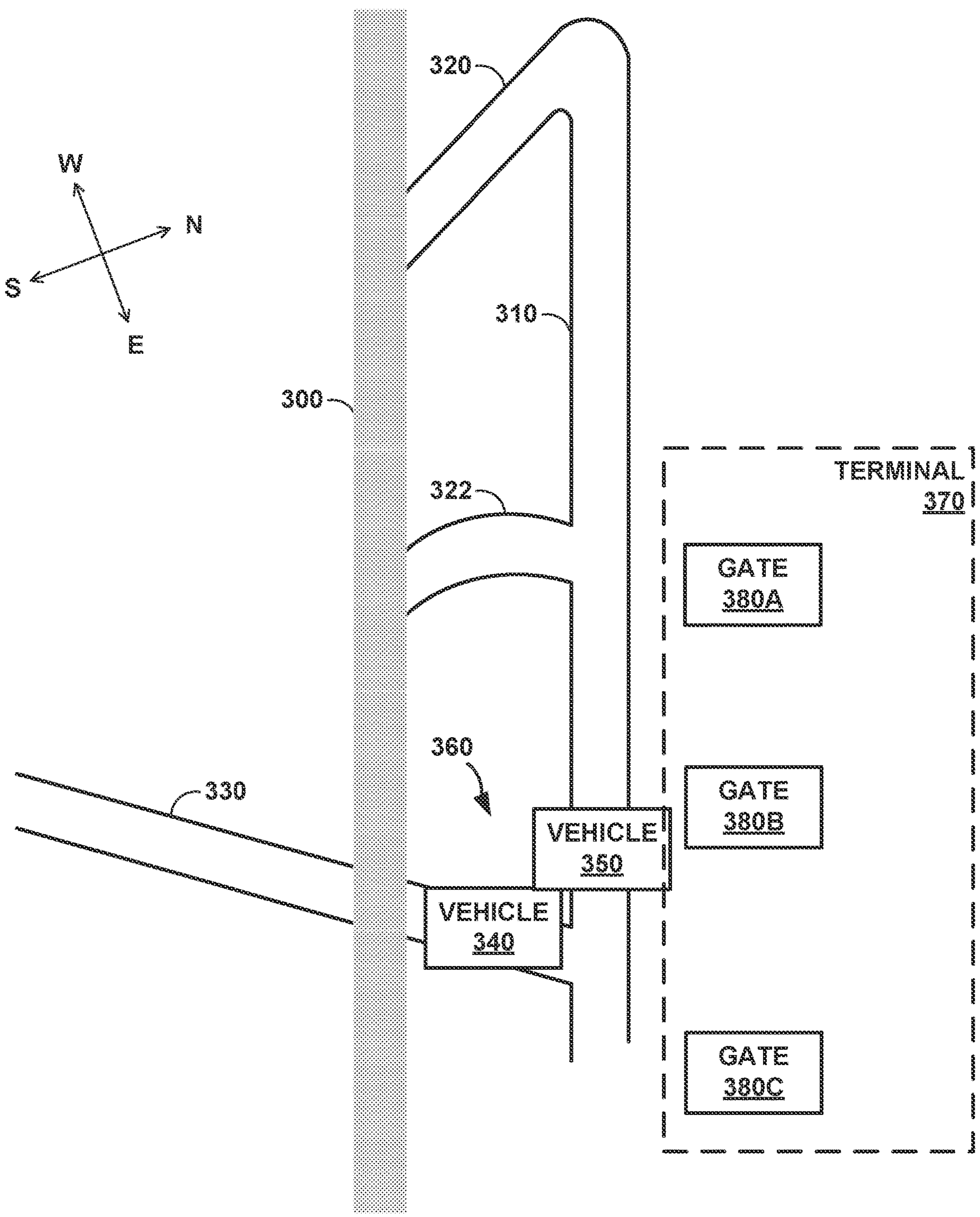

Because vehicle 340 is not positioned correctly, vehicle 350 collides with vehicle 340 at location 360, as shown in FIG. 3D. Location 360 at the intersection of taxiways 310 and 330 is an example of a dynamic hot spot. Location 360 is a dynamic hot spot because vehicle 340 is positioned near location 360. In examples in which vehicle 340 is not positioned near location 360, location 360 may not be considered a hot spot. The ground traffic controller was not aware of the incorrect position of vehicle 340 because the traffic controller cleared vehicle 340 to hold short of runway 300 without obstructing taxiway 310. Without a means for confirming that vehicle 340 is positioned correctly, the traffic controller instructed vehicle 350 to travel on taxiway 310 in a southeast direction towards location 360.

A collision awareness system could predict the potential collision between vehicles 340 and 350 based on the clearances issued to vehicles 340 and 350 and an image of vehicle 340 at location 360. The collision awareness system could use the clearance and the image to determine whether vehicle 340 was positioned correctly. The collision awareness system would identify the type of vehicle 340 and obtain the airframe information from a database to determine the dimensions (e.g., wingspan) of vehicle 340. The collision awareness system could then determine if vehicle 340 was obstructing the movement of vehicles along taxiway 310.

The collision awareness system can also determine the type of vehicle 350 and obtain the airframe information for vehicle 350 from a database. The collision awareness system can use the dimensions for vehicle 350, along with the clearance for vehicle 350, in determining whether a collision between vehicles 340 and 350 is likely to occur at location 360. The collision awareness system can use the clearance sent to vehicle 350 by the control center to determine that the travel path of vehicle 350 is nearby the position of vehicle 340.

The safety of vehicles 340 and 350 in the case study illustrated in FIGS. 3A-3D could be improved by close observation of taxiways 310, 320, 322, and 330. In the case study illustrated in FIGS. 3A-3D, runway 300 is free from obstacles, which may not be detected by an existing runway incursion system or a Visual GeoSolutions system at an airport. A collision awareness system described herein can construct an envelope around moving objects, such as vehicles 340 and 350, and alert vehicle operators and control centers to the real-time hot spots using real-time position information for the moving objects.

Although there are many hot spots in each airport, where each hot spot is determined based on many factors, not every hot spot is important to the operator of vehicle 340 or to the operator of vehicle 350. For example, the hot spots along the travel path of vehicle 350 to gate 380C are important to the operator of vehicle 350. A display system in vehicle 350 may be configured to present hot spots to the operator and/or crew based on clearance(s) received by vehicle 350. For example, an avionics system in vehicle 350 can determine a travel path for vehicle 350 based on received clearance(s), determine hot spot along or near the travel path, and present indications of the hot spots to the operator of vehicle 350.

The position of cameras within the areas around hot spots is important. Strategically positioned cameras can capture images that can be used by a collision awareness system to predict a collision between vehicles 340 and 350. Cameras should be positioned near hotspots such as location 360, gates 380A-380C, and other intersections.

Figure 3E:
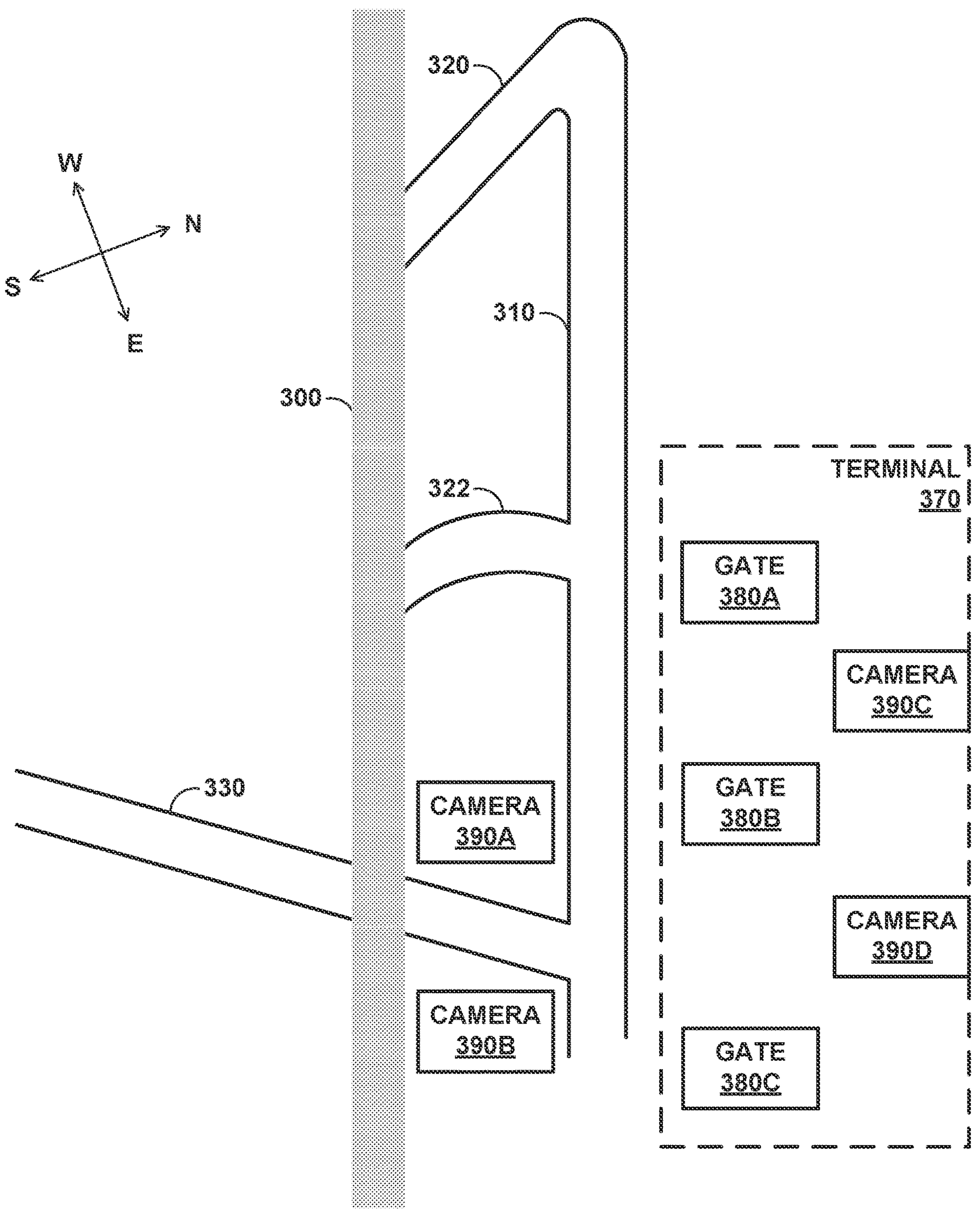
FIGS. 3E and 4 are diagrams showing possible locations for cameras at an airport.
Figure 4:
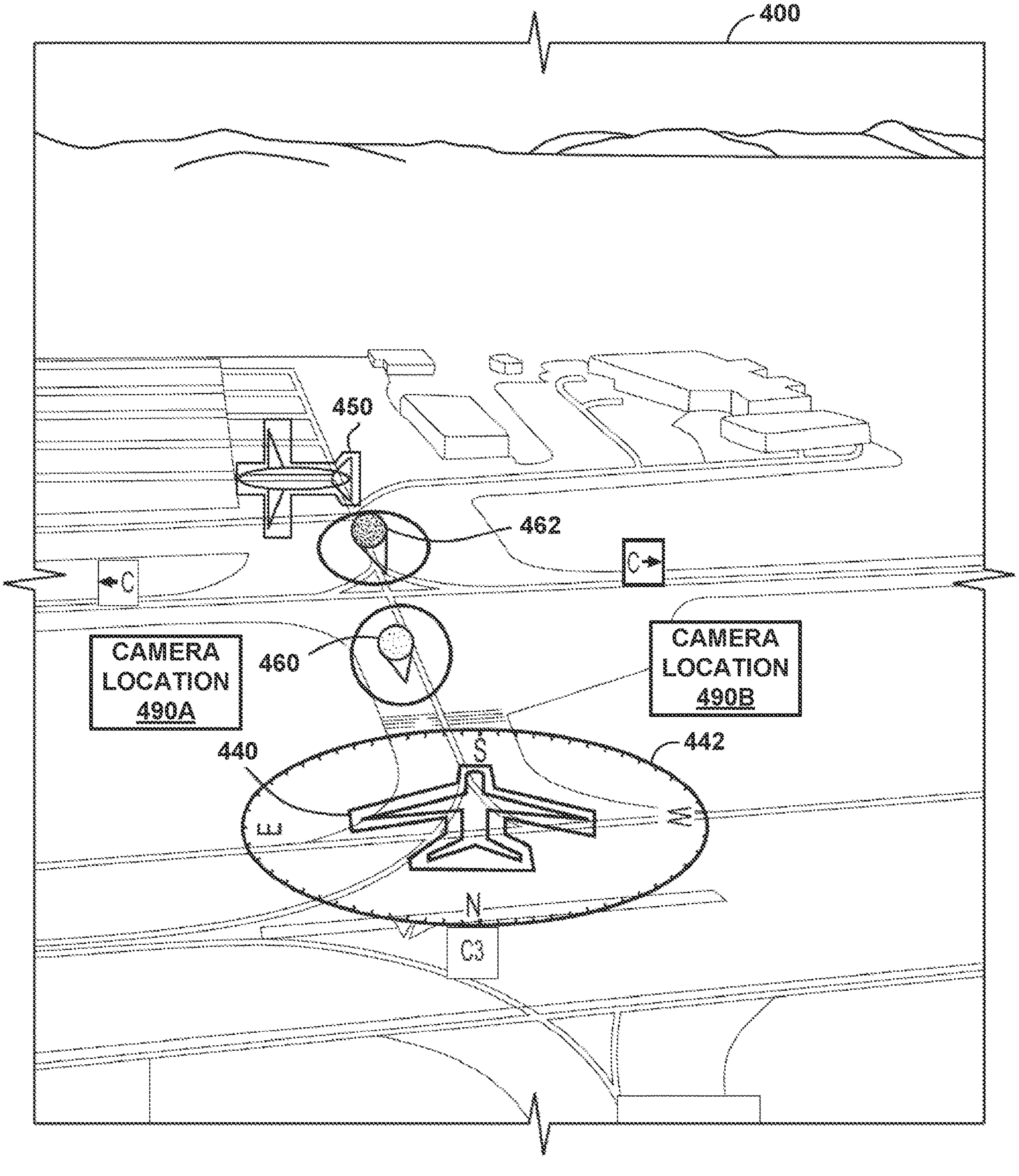

FIGS. 3E and 4 are diagrams showing possible locations for cameras at an airport. FIG. 3E shows possible locations for cameras 390A-390D near the collision location of vehicles 340 and 350. Cameras 390A-390D can capture images of runway 300, taxiways 310, 322, and 330, and gates 380A-380C. Cameras 390A and 390B may be mounted to a light pole, attached to a building, or mounted on a UAV. Cameras 390C and 390D can be mounted to or in terminal 370 to capture images of vehicles near gates 380A-380C. Cameras 390A-390D should be positioned in locations where visibility to potential collision-prone areas and areas with frequent wingtip collisions is high. Cameras 390A-390D should also be able to capture images of vehicle maneuverability areas. Cameras 390A-390D may include a transmitter for sending the captured images to the collision awareness system for image processing and collision prediction.

FIG. 4 shows an example graphical user interface 400 for a vehicle display to present to a vehicle operator and crewmembers. Graphical user interface 400 shows graphical icons 460 and 462, which represent dynamic hot spots based on the position of nearby vehicles. Graphical user interface 400 can also present alerts received from a collision awareness system, such as an indication of a location where a potential collision is predicted. FIG. 4 depicts vehicles 440 and 450 and graphical icons 460 and 462 that can be presented via any system involved in the operation, management, monitoring, or control of vehicle 440 such as a cockpit system, an electronic flight bag, a mobile device used by airport personnel and/or aircraft crew, airport guidance systems within the airport system, such as A-SMGCS, and visual guidance system. Graphical user interface is an example of an airport moving map that includes crew interface symbologies.

Graphical user interface 400 includes graphical representation 442 of the safety envelope formed around the airframe of vehicle 440. The collision awareness system can construct a safety envelope for vehicle 440 based on the position of vehicle 440 determined from an image captured by a camera at location 490A or 490B. The collision awareness system can modify the safety envelope based a velocity of vehicle 440 determined from images, clearances, and/or radar returns. The collision awareness system can transmit information about the safety envelope to vehicle 440 so that graphical user interface 400 can be presented to the vehicle operator with graphical representation 442 showing the safety envelope.

The graphical icons 460 and 462, which indicate hot spots, may be color-coded. For instance, a green marking may indicate that the corresponding hot spot is safe and no preventative action is necessary (e.g., hot spot(s) with a low probability of collision). A yellow marking may indicate that the corresponding hot spot may pose some danger and the aircraft should approach the hot spot with caution (e.g., hot spot(s) with a moderate probability of collision). A red marking may indicate that the aircraft is likely to collide with an object at the corresponding hot spot (e.g., hot spot(s) with a high possibility of collision, e.g., above a predefined threshold) and a preventative action is required to avoid the collision. Further, the markings may be intuitive in that the types of the surface objects that would be potential threats for collision at the hot spots may be indicated within the markings.

Within the circular portion at the top of each marking (e.g., circular portions of graphical icons 460 and 462), a symbol, shape, or icon that represents the type of surface object that would be a potential threat for collision at the corresponding hot spot may be included (e.g., visually displayed). As the vehicle 440 moves in the aerodrome (e.g., taxiway, runway, etc.), graphical user interface 400 can present only the hot spots located in the planned route of the vehicle, and not the hot spots that are no longer in the aircraft's planned route and/or the hot spots that are associated with a probability of collision below a certain threshold (e.g., hot spots that are considered a non-threat). In other words, the determination and display of vehicle 440, surface objects, graphical icons 460 and 462 for hot spots may be updated in real-time.

The avionics system in vehicle 440 can determine a travel path for vehicle 440 based on a clearance received by vehicle 440. The avionics system can determine the hot spots located along the travel path of vehicle 440 and present graphical icons of the hot spots to the operator of vehicle 440. The avionics system can update the graphical icons in real-time such that a new clearance received by vehicle 440 results in an update determination of which hot spots are relevant vehicle 440. In some examples, a collision awareness system remote from vehicle 440 can determine the locations of hot spots relevant to vehicle 440 based on a clearance received by vehicle 440. The collision awareness system can communicate the hot spot locations to vehicle 440 so that vehicle 440 can present the hot spot locations to the operator of vehicle 440.

FIG. 4 also shows camera locations 490A and 490B near vehicle 440 and graphical icons 460 and 462. At locations 490A and 490B, cameras can capture images of vehicle 440 and/or vehicle 450. The cameras can also capture images of the hot spots indicated by graphical icons 460 and 462. The camera can be pointed towards the hot spot indicated by graphical icon 460 and/or 462 in order to capture images of vehicles near the hot spot.

Figure 5:
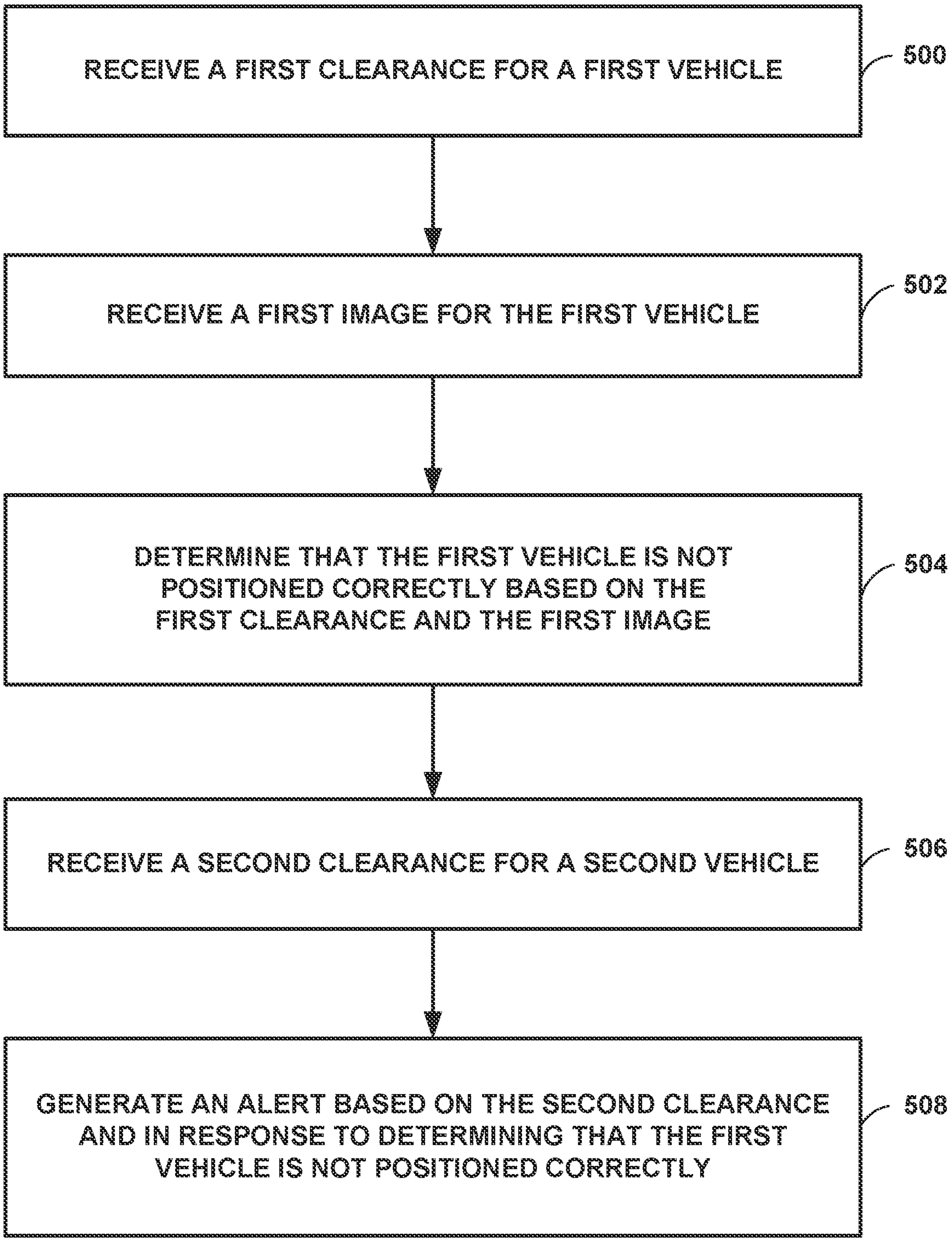
FIGS. 5-7 are flowcharts illustrating example processes for generating an alert indicating a potential collision, in accordance with some examples of this disclosure.
Figure 6:
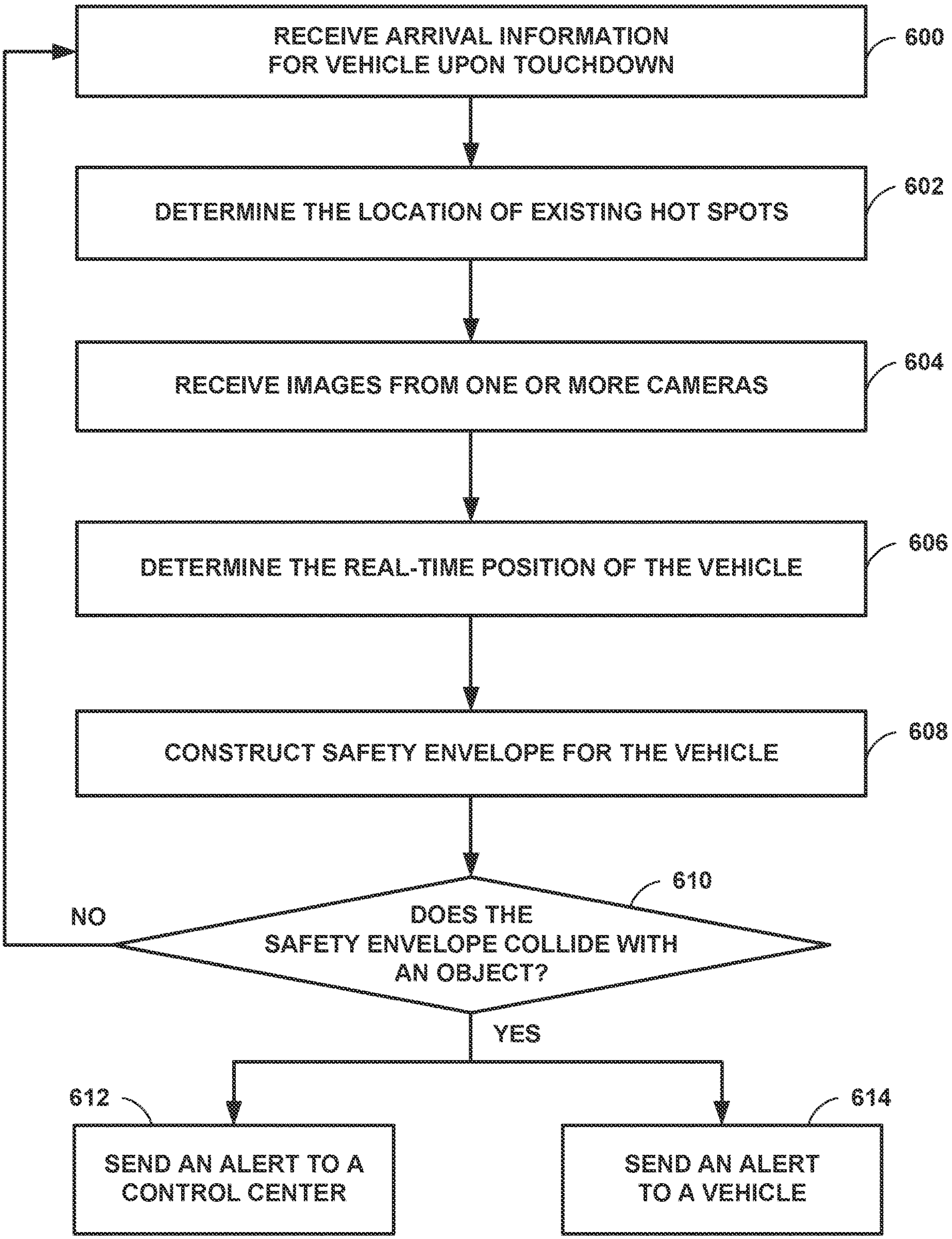
Figure 7:
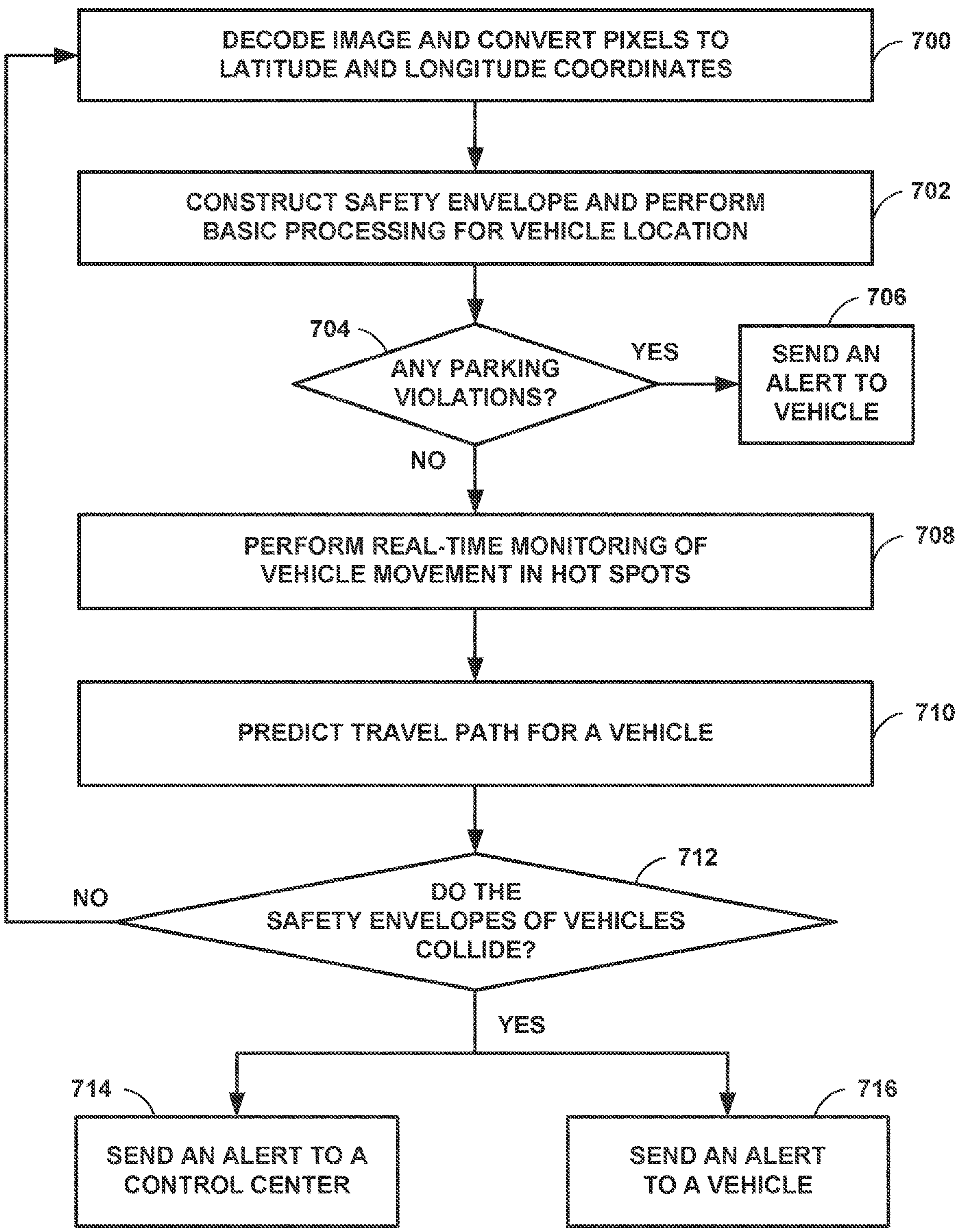

FIGS. 5-7 are flowcharts illustrating example processes for generating an alert indicating a potential collision, in accordance with some examples of this disclosure. The example processes of FIGS. 5-7 are described with reference to collision awareness system 100 shown in FIG. 1 and the airport scenario depicted in FIGS. 3A-3D, although other components may exemplify similar techniques. Processing circuitry 110 can perform an example process of one of FIGS. 5-7 once, or processing circuitry 110 can perform the example process periodically, repeatedly, or continually.

In the example of FIG. 5, receiver 120 receives clearance 142 for vehicle 140 from control center 130 (500). Clearance 142 may instruct vehicle 140 to travel to specific location and hold short of an intersection until control center 130 instructs vehicle 140 to proceed through the intersection. Receiver 120 receives image 182 of vehicle 140 from camera 180 (502). Processing circuitry 110 can determine a position of vehicle 140 based on image 182 using image processing techniques. Processing circuitry 110 can also determine the position of a protrusion of vehicle 140 and determine whether the protrusion obstructs the movement of vehicles on another In the example of FIG. 5, receiver 120 receives clearance 152 for vehicle 150 from control center 130 (504). Clearance 152 may instruct vehicle 150 to travel to another location. Processing circuitry 110 can determine a projected travel path for vehicle 150 based on clearance 152. Processing circuitry 110 can also determine whether vehicle 150 will travel near vehicle 140 based on the projected travel path.

In the example of FIG. 5, processing circuitry 110 determines that vehicle 140 is positioned incorrectly based on clearance 142 and image 182 (506). Processing circuitry 110 can determine the location of vehicle 140 by matching features in image 182 to a template for vehicle 140. Processing circuitry 110 can also compare the position of vehicle 140 shown in image 182 to other landmarks in image 182 to determine whether vehicle 140 is positioned correctly. Processing circuitry 110 can determine whether vehicle 140 is positioned correctly by determining whether any of the protrusions of vehicle 140 are obstructing the movement of vehicles in a roadway, taxiway, or runway.

In the example of FIG. 5, processing circuitry 110 generates alert 190 based on clearance 152 and in response to determining that vehicle 140 is positioned incorrectly (508). Processing circuitry 110 can determine that clearance 152 instructs vehicle 150 to pass near the position of vehicle 140. Turning to the example shown in FIGS. 3C and 3D, the clearance instructs vehicle 350 to travel on taxiway 310 near the position of vehicle 340.

In some examples, receiver 120 receives a subsequent image after receiving image 182. The subsequent image may show a different position for vehicle 140. Processing circuitry 110 can determine that vehicle 140 is positioned correctly based on the subsequent image and clearance 142. In response to determining that vehicle 140 is now positioned correctly, processing circuitry 110 can generate a caution, rather than alert 190, to notify vehicles 140 and 150 and control center 130 that the likelihood of a collision between vehicles 140 and 150 has decreased. A caution may indicate a lower likelihood of collision, whereas alert 190 may indicate a higher likelihood of collision. For example, processing circuitry 110 can issue a caution in response to determining that the vehicles 140 and 150 will pass within a first threshold distance of each other and issue alert 190 in response to determining that the vehicles 140 and 150 will pass within a second threshold distance of each other, where the second threshold distance is less than the first threshold distance.

In the example of FIG. 6, processing circuitry 110 receives arrival information for vehicle 140 upon touchdown of vehicle 140 on a runway (600). Processing circuitry 110 can determine the arrival information for vehicle 140 using a navigational database and/or a transcript of an audio conversation between a traffic controller at center control 130 and the operator of vehicle 140. The transcript may be part of clearance 142 issued by control center 130. The arrival information can include the taxiway, terminal, and hangar details for vehicle 140.

In the example of FIG. 6, processing circuitry 110 also determines the location of existing hot spots, such as runway/taxiway intersections, parked aircraft terminals, and taxiway intersections with aprons (602). Processing circuitry 110 can determine that a hot spot existing at any location that has a large amount of traffic. Receiver 120 can receive images 182 from one or more cameras 180 (604). Camera 180 can capture high-resolution pictures of the projected travel path of vehicle 140 in the surface of an airport. Camera 180 can have characteristics such as infrared and zoom to help camera 180 function well even during bad weather conditions such as low visibility, high winds, and drafty conditions. The travel path may include parked aircraft terminals, taxiway intersections with aprons, and taxiways. Processing circuitry 110 can store images 182 to a cloud server.

In the example of FIG. 6, processing circuitry 110 determines the real-time position of vehicle 140 based on image 182 (606). Processing circuitry 110 can determine the real-time position of vehicle 140 in terms of the latitude and longitude. Processing circuitry 110 then constructs a safety envelope for vehicle 140 (608). Processing circuitry 110 can use the contours, airframe, and velocity of vehicle 140 to construct the safety envelope. The safety envelope is a buffer around vehicle 140 that processing circuitry 110 uses to determine whether another will be too close to vehicle 140 such that a collision is possible. Processing circuitry 110 can determine the boundaries of the safety envelope using a template that is based on the dimensions of vehicle 140, determined from image 182 and/or a database of vehicle dimensions.

In the example of FIG. 6, processing circuitry 110 determines whether the safety envelope of vehicle 140 collides with an object (610). Processing circuitry 110 predicts the real-time and projected position of the safety envelope and determines whether the safety envelope of vehicle 140 collides with the static or moving envelope of other objects. Processing circuitry 110 can use video analytics and terminal information for collision detection and avoidance. For example, processing circuitry 110 can predict that the wing of vehicle 150 collides with the wing of vehicle 140 while vehicle 140 is holding short of a runway or a taxiway. In response to determining that the safety envelope of vehicle 140 will not collide with an object, processing circuitry 110 stops the process or returns to step 600 for another vehicle.

In response to determining that the safety envelope of vehicle 140 will collide with an object, processing circuitry 110 can send alert 190 to control center 130, vehicle 140, and/or vehicle 150 (612, 614). Processing circuitry 110 can send a warning to an airport guidance system such as A-SMGCS. Processing circuitry 110 can also issue a real-time hot spot predictive alert to the cockpit of vehicle 140 and/or 150 well in advance of a potential collision.

In the example of FIG. 7, processing circuitry 110 decodes image 182 and converts the pixels of image 182 to latitude and longitude coordinates (700). Collision awareness system 100 receives image 182 (e.g., as surface image files) from camera 180 (e.g., an IoT camera). Image 182 may be a high-resolution image. Using the data from image 182, processing circuitry 110 constructs a safety envelope around a surface object and performs basic processing for the location of vehicles 140 and 150 (702). For example, processing circuitry 110 can determine that vehicle 140 is incorrectly parked in an apron area because vehicle 140 is extending past a boundary line painted on the surface of the apron.

Processing circuitry 110 determines whether parking violations exist (704). In response to determining that a parking violation exists, processing circuitry 110 sends alert 190 to vehicle 140 and/or 150 with suitable symbology (706). In response to determining that no parking violations exist, processing circuitry 110 performs real-time monitoring of the movement of vehicle 140 and/or 150 in hot spots (708). Processing circuitry 110 uses the real-time positions of vehicles 140 and 150 received via augmented position receivers and airport visual guidance systems. Processing circuitry 110 monitors the hot spots to determine whether any vehicle is positioned incorrectly such that a collision is possible.

Processing circuitry 110 predicts a travel path for vehicle 140 (710). Processing circuitry 110 can based the real-time predicted travel path across the airport surface on the instructions in clearance 142, data from augmented position sensors, ADS-B data, datalink data, and images 182 received from camera 180. Processing circuitry 110 can use the travel path to construct a safety envelope for vehicle 140. Processing circuitry 110 then determines whether the safety envelope of vehicle 140 collides with any other object, such as vehicle 150 (712). Processing circuitry 110 can also construct safety envelope for vehicle 150 and determine whether the two safety envelopes collide. Processing circuitry 110 can use a period of time to determine whether a collision occurs within the period of time. In response to determining that the safety envelopes do not collide, processing circuitry 110 can stop the process or return to step 700.

In response to determining that the safety envelope collide, processing circuitry 110 can send alert 190 to control center 130, vehicle 140, and/or vehicle 150 (714, 716). Processing circuitry 110 can send a warning to an airport guidance system such as A-SMGCS. Processing circuitry 110 can also issue a real-time hot spot predictive alert to the cockpit of vehicle 140 and/or 150 well in advance of a potential collision.

The following numbered examples demonstrate one or more aspects of the disclosure.

Example 1

A method for providing collision awareness includes receiving a first clearance for a first vehicle, receiving a first image of the first vehicle, and determining that the first vehicle is positioned incorrectly based on the first clearance and the first image. The method also includes receiving a second clearance for a second vehicle and generating an alert based on the second clearance and in response to determining that the first vehicle is positioned incorrectly.

Example 2

The method of example 1, further including receiving a second image of first vehicle after receiving the first image and determining that the first vehicle is positioned correctly based on the first clearance and the second image. The method also includes generating a caution based on the second clearance and in response to determining that the first vehicle is positioned correctly.

Example 3

The method of examples 1-2 or any combination thereof, further including determining a position of the first vehicle based on the first image and determining that the second clearance instructs the second vehicle to travel near the position of the first vehicle. Generating the alert is in response to determining that the second clearance instructs the second vehicle to travel near the position of the first vehicle.

Example 4

The method of examples 1-3 or any combination thereof, further including constructing a safety envelope for the first vehicle based on the position of the first vehicle determined from the first image and determining that the second clearance instructs the second vehicle to enter the safety envelope. Generating the alert is in response to determining that the second clearance instructs the second vehicle to enter the safety envelope.

Example 5

The method of examples 1-4 or any combination thereof, where the second vehicle is an aircraft, the method further includes determining a wingspan of the aircraft, and determining that the second clearance instructs the aircraft to enter the safety envelope is based on the wingspan of the aircraft.

Example 6

The method of examples 1-5 or any combination thereof, where determining that the first vehicle is positioned incorrectly includes determining that the first clearance instructs the first vehicle to travel to a first position. Determining that the first vehicle is positioned incorrectly also includes determining, based on the first image, that the first vehicle is not within an acceptable distance of the first position.

Example 7

The method of examples 1-6 or any combination thereof, further including determining a travel path for the second aircraft based on the second clearance, receiving a second image, and determining a location of debris based on the second image. The method also includes determining that the location of the debris is in the travel path for the second aircraft and generating the alert in response to determining that the location of the debris is in the travel path for the second aircraft.

Example 8

The method of examples 1-7 or any combination thereof, where receiving the first clearance includes receiving audio data including the first clearance, and the method further includes determining a future position of the first vehicle based on the audio data.

Example 9

The method of examples 1-8 or any combination thereof, further including transmitting the alert to the first vehicle.

Example 10

The method of examples 1-9 or any combination thereof, where the first vehicle is an aircraft, and the method further includes determining a type of the aircraft and determining that the first image is blurry based on comparing the first image to an airframe template for the type of aircraft. The method also includes processing the first image in response to determining that determining that the first image is blurry.

Example 11

The method of examples 1-10 or any combination thereof, where determining that the first vehicle is positioned incorrectly includes fusing the first clearance and the first image.

Example 12

The method of examples 1-11 or any combination thereof, where receiving the first image includes receiving the first image from a camera mounted on a pole, a building, or an unmanned aerial vehicle at an airport.

Example 13

The method of examples 1-12 or any combination thereof, where receiving the first image includes receiving the first image of a taxiway intersection or a gate at an airport.

Example 14

A collision awareness system includes a receiver configured to receive a first clearance for a first vehicle, receive a first image of the first vehicle, and receive a second clearance for a second vehicle. The collision awareness system also includes processing circuitry configured to determine that the first vehicle is positioned incorrectly based on the first clearance and the first image. The processing circuitry is also configured to generate an alert based on the second clearance and in response to determining that the first vehicle is positioned incorrectly.

Example 15

The device of example 14, where the processing circuitry is configured to perform the method of examples 1-13 or any combination thereof.

Example 16

A device includes a computer-readable medium having executable instructions stored thereon, configured to be executable by processing circuitry for causing the processing circuitry to receive a first clearance for a first vehicle, receive a first image of the first vehicle, and determine that the first vehicle is positioned incorrectly based on the first clearance and the first image. The instructions are also configured to cause the processing circuitry to receive a second clearance for a second vehicle, and generate an alert based on the second clearance and in response to determining that the first vehicle is positioned incorrectly.

Example 17

The device of example 16, where instructions are configured to cause the processing circuitry to perform the method of examples 1-13 or any combination thereof.

Example 18

A system including means for receiving a first clearance for a first vehicle, means for receiving a first image of the first vehicle, and means for determining that the first vehicle is positioned incorrectly based on the first clearance and the first image. The system also includes means for receiving a second clearance for a second vehicle and means for generating an alert based on the second clearance and in response to determining that the first vehicle is positioned incorrectly.

The disclosure contemplates computer-readable storage media including instructions to cause a processor to perform any of the functions and techniques described herein. The computer-readable storage media may take the example form of any volatile, non-volatile, magnetic, optical, or electrical media, such as a random access memory (RAM), read-only memory (ROM), non-volatile RAM (NVRAM), electrically erasable programmable ROM (EEPROM), or flash memory. The computer-readable storage media may be referred to as non-transitory. A computing device may also contain a more portable removable memory type to enable easy data transfer or offline data analysis.

The techniques described in this disclosure, including those attributed to collision awareness systems 100 and 200, processing circuitry 110, receiver 120, memory 122, transmitter 124, control center 130, vehicles 140, 150, 340, and 350, camera 180, image processor 230, collision predictor 240, and/or alerting system 250, and various constituent components, may be implemented, at least in part, in hardware, software, firmware or any combination thereof. Such hardware, software, and/or firmware may support simultaneous or non-simultaneous bi-directional messaging and may act as an encrypter in one direction and a decrypter in the other direction. For example, various aspects of the techniques may be implemented within one or more processors, including one or more microprocessors, digital signal processors (DSPs), application-specific integrated circuits (ASICs), field-programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices, such as between collision awareness systems 100 and 200, processing circuitry 110, receiver 120, memory 122, transmitter 124, control center 130, vehicles 140, 150, 340, and 350, camera 180, image processor 230, collision predictor 240, and/or alerting system 250. Such hardware may support simultaneous or non-simultaneous bi-directional messaging and may act as an encrypter in one direction and a decrypter in the other direction. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors.

In some examples, a computer-readable storage medium includes non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein, including, but not limited to, collision awareness systems 100 and 200, processing circuitry 110, receiver 120, memory 122, transmitter 124, control center 130, vehicles 140, 150, 340, and 350, camera 180, image processor 230, collision predictor 240, and/or alerting system 250, may be programmed with various forms of software. The one or more processors may be implemented at least in part as, or include, one or more executable applications, application modules, libraries, classes, methods, objects, routines, subroutines, firmware, and/or embedded code, for example.

Various examples of the disclosure have been described. Any combination of the described systems, operations, or functions is contemplated. These and other examples are within the scope of the following claims.

What is claimed is:

1. A collision awareness system comprising:
a receiver configured to:
receive a first clearance for a first vehicle, wherein the first clearance comprises a first instruction from a traffic controller to the first vehicle;
receive a first image of the first vehicle; and
receive a second clearance for a second vehicle, wherein the second clearance comprises a second instruction from the traffic controller to the second vehicle; and
processing circuitry configured to:
determine that the first vehicle is positioned incorrectly based on the first clearance and the first image; and
generate an alert based on the second clearance and in response to determining that the first vehicle is positioned incorrectly.

2. The collision awareness system of claim 1,
wherein the receiver is configured to receive a second image of the first vehicle after receiving the first image, and
wherein the processing circuitry is further configured to:
determine that the first vehicle is positioned correctly based on the first clearance and the second image; and
generate a caution based on the second clearance and in response to determining that the first vehicle is positioned correctly.

3. The collision awareness system of claim 1, wherein the processing circuitry is further configured to:
determine a position of the first vehicle based on the first image; and
determine that the second clearance instructs the second vehicle to travel near the position of the first vehicle,
wherein the processing circuitry is configured to generate the alert in response to determining that the second clearance instructs the second vehicle to travel near the position of the first vehicle.

4. The collision awareness system of claim 1, wherein to determine that the first vehicle is positioned incorrectly, the processing circuitry is configured to:
determine that the first clearance instructs the first vehicle to travel to a first position; and
determine, based on the first image, that the first vehicle is not within an acceptable distance of the first position.

5. The collision awareness system of claim 1,
wherein the receiver is configured to receive the first clearance by receiving audio data including the first clearance, and
wherein the processing circuitry is further configured to determine a future position of the first vehicle based on the audio data.

6. The collision awareness system of claim 1, further comprising a transmitter to transmit the alert to the first vehicle.

7. The collision awareness system of claim 1, wherein the receiver is configured to receive the first image by receiving the first image from a camera mounted on a pole, a building, or an unmanned aerial vehicle at an airport.

8. The collision awareness system of claim 1, wherein the receiver is configured to receive the first image by receiving the first image of a taxiway intersection or a gate at an airport.

9. A method for providing collision awareness, the method comprising:
receiving a first clearance for a first vehicle, wherein the first clearance comprises a first instruction from a traffic controller to the first vehicle;
receiving a first image of the first vehicle;
determining that the first vehicle is positioned incorrectly based on the first clearance and the first image;

receiving a second clearance for a second vehicle, wherein the second clearance comprises a second instruction from the traffic controller to the second vehicle; and generating an alert based on the second clearance and in response to determining that the first vehicle is positioned incorrectly.

10. The method of claim 9, further comprising:

receiving a second image of the first vehicle after receiving the first image;

determining that the first vehicle is positioned correctly based on the first clearance and the second image; and generating a caution based on the second clearance and in response to determining that the first vehicle is positioned correctly.

11. The method of claim 9, further comprising:

determining a position of the first vehicle based on the first image; and determining that the second clearance instructs the second vehicle to travel near the position of the first vehicle, wherein generating the alert is in response to determining that the second clearance instructs the second vehicle to travel near the position of the first vehicle.

12. The method of claim 9, wherein determining that the first vehicle is positioned incorrectly comprises:

determining that the first clearance instructs the first vehicle to travel to a first position; and determining, based on the first image, that the first vehicle is not within an acceptable distance of the first position.

13. The method of claim 9, wherein receiving the first clearance comprises receiving audio data including the first clearance, further comprising determining a future position of the first vehicle is based on the audio data.

14. The method of claim 9, further comprising transmitting the alert to the first vehicle.

15. The method of claim 9, wherein receiving the first image comprises receiving the first image from a camera mounted on a pole, a building, or an unmanned aerial vehicle at an airport.

16. The method of claim 9, wherein receiving the first image comprises receiving the first image of a taxiway intersection or a gate at an airport.

17. A device comprising a computer-readable medium having executable instructions stored thereon, configured to be executable by processing circuitry for causing the processing circuitry to:

receive a first clearance for a first vehicle, wherein the first clearance comprises a first command from a traffic controller to the first vehicle;

receive a first image of the first vehicle;

determine that the first vehicle is positioned incorrectly based on the first clearance and the first image;

receive a second clearance for a second vehicle, wherein the second clearance comprises a second command from the traffic controller to the second vehicle; and generate an alert based on the second clearance and in response to determining that the first vehicle is positioned incorrectly.

18. The device of claim 17, wherein the instructions are configured to be executable by the processing circuitry for further causing the processing circuitry to:

receive a second image of the first vehicle after receiving the first image;

determine that the first vehicle is positioned correctly based on the first clearance and the second image; and generate a caution based on the second clearance and in response to determining that the first vehicle is positioned correctly.

19. The device of claim 17, wherein the instructions are configured to be executable by the processing circuitry for further causing the processing circuitry to:

determine a position of the first vehicle based on the first image; and determine that the second clearance instructs the second vehicle to travel near the position of the first vehicle, wherein the instructions to generate the alert comprise instructions to generate the alert in response to determining that the second clearance instructs the second vehicle to travel near the position of the first vehicle.

20. The device of claim 17, wherein to determine that the first vehicle is positioned incorrectly, the instructions cause the processing circuitry to:

determine that the first clearance command the first vehicle to travel to a first position; and determine, based on the first image, that the first vehicle is not within an acceptable distance of the first position.

* * * * *